US007742430B2

(12) United States Patent
Scoggins et al.

(10) Patent No.: US 7,742,430 B2
(45) Date of Patent: Jun. 22, 2010

(54) SYSTEM FOR AUTOMATED MANAGEMENT OF SPONTANEOUS NODE MIGRATION IN A DISTRIBUTED FIXED WIRELESS NETWORK

(75) Inventors: Sean M. Scoggins, Raleigh, NC (US); Russell G. Christopher, Clayton, NC (US); Alexei Garianov, Boulder, CO (US); Kathryn J. Smith, Raleigh, NC (US); Susane K. Nemecz, Garner, NC (US); Dileep Rudran, Cary, NC (US)

(73) Assignee: Elster Electricity, LLC, Raleigh, NC (US)

( * ) Notice: Subject to any disclaimer, the term of this patent is extended or adjusted under 35 U.S.C. 154(b) by 1207 days.

(21) Appl. No.: 10/949,682

(22) Filed: Sep. 24, 2004

(65) Prior Publication Data

US 2006/0072465 A1    Apr. 6, 2006

(51) Int. Cl.
*H04L 12/28* (2006.01)
(52) U.S. Cl. .................. 370/254; 370/331; 370/338; 340/870.02; 702/62; 705/412
(58) Field of Classification Search .................. 370/329, 370/339, 254, 331; 702/61, 62; 705/63, 705/412; 709/223, 218, 224; 455/436, 432.1, 455/432.2, 433, 434, 435.1, 437–445, 449; 340/870.01–870.44, 853.1–856.4
See application file for complete search history.

(56) References Cited

U.S. PATENT DOCUMENTS 3,455,815 A    7/1969    Saltzberg et al. ............ 340/163

| 3,858,212 A | 12/1974 | Tompkins et al. ..... 343/100 CS |
|---|---|---|
| 3,878,512 A | 4/1975 | Kobayashi et al. ...... 340/168 R |
| 3,973,240 A | 8/1976 | Fong .......................... 340/151 |
| 4,031,513 A | 6/1977 | Simciak ................... 340/152 T |
| 4,056,107 A | 11/1977 | Todd et al. ..................... 130/27 |
| 4,066,964 A | 1/1978 | Costanza et al. .............. 325/55 |

(Continued)

FOREIGN PATENT DOCUMENTS

CH    682196 A5    7/1993

(Continued)

OTHER PUBLICATIONS

Norenkov, et al., *Telecommunication Technologies and Networks*, Moscow Bauman Technical School, 1988, (Signed for publication on Dec. 10, 1997), pp. 116-118, 80-87 [1] English Language Abstract Provided.

(Continued)

*Primary Examiner*—Ian N Moore
(74) *Attorney, Agent, or Firm*—Woodcock Washburn LLP

(57) ABSTRACT

Methods and systems of managing node migration in a wireless network where nodes may spontaneously migrate from a first communication path to a second communication path. The system includes a first collector disposed within the first communication path and a second collector disposed within the second communication path, a network management server that determines a network state and maintains a database of the network state. When the network management server detects that a node has migrated from the first communication path to the second communication path, information associated with the node is retrieved from the first collector and downloaded to the second collector to ensure the proper operation of the node in the network.

15 Claims, 3 Drawing Sheets

U.S. PATENT DOCUMENTS

| | | | |
|---|---|---|---|
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,218,737 A | 8/1980 | Buscher et al. | 364/493 |
| 4,250,489 A | 2/1981 | Dudash et al. | 340/147 |
| 4,254,472 A | 3/1981 | Juengel et al. | 364/900 |
| 4,319,358 A | 3/1982 | Sepp | 375/1 |
| 4,321,582 A | 3/1982 | Banghart | 340/310 |
| 4,322,842 A | 3/1982 | Martinez | 370/204 |
| 4,328,581 A | 5/1982 | Harmon et al. | 371/8 |
| 4,361,851 A | 11/1982 | Asip et al. | 358/84 |
| 4,361,890 A | 11/1982 | Green, Jr. et al. | 375/1 |
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.3 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzemeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swartzrauber et al. | 364/483 |
| 4,792,946 A | 12/1988 | Mayo | 370/338 |
| 4,799,059 A | 1/1989 | Grindahl et al. | 340/870.03 |
| 4,804,938 A | 2/1989 | Rouse et al. | 340/310 |
| 4,804,957 A | 2/1989 | Selph et al. | 340/870.03 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.2 |
| 5,197,095 A | 3/1993 | Bonnet | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |

| | | | |
|---|---|---|---|
| 5,457,713 A | 10/1995 | Sanderford, Jr. et al. ..... 375/206 |
| 5,461,558 A | 10/1995 | Patsiokas et al. ............ 364/145 |
| 5,463,657 A | 10/1995 | Rice ........................ 375/200 |
| 5,473,322 A | 12/1995 | Carney ................. 340/870.02 |
| 5,475,742 A | 12/1995 | Gilbert ...................... 379/106 |
| 5,475,867 A | 12/1995 | Blum ....................... 455/53.1 |
| 5,479,442 A | 12/1995 | Yamamoto ................. 375/206 |
| 5,481,259 A | 1/1996 | Bane ..................... 340/870.03 |
| 5,488,608 A | 1/1996 | Flammer, III ............ 370/85.13 |
| 5,491,473 A | 2/1996 | Gilbert ................. 340/870.01 |
| 5,493,287 A | 2/1996 | Bane ..................... 340/825.52 |
| 5,495,239 A | 2/1996 | Ouellette ................ 340/870.02 |
| 5,497,424 A | 3/1996 | Vanderpool ................. 380/34 |
| 5,499,243 A | 3/1996 | Hall ........................ 370/85.8 |
| 5,500,871 A | 3/1996 | Kato et al. ................. 375/208 |
| 5,511,188 A | 4/1996 | Pascucci et al. ............ 395/600 |
| 5,519,388 A | 5/1996 | Adair, Jr. ............... 340/870.02 |
| 5,521,910 A | 5/1996 | Matthews .................... 370/54 |
| 5,522,044 A | 5/1996 | Pascucci et al. ........ 395/200.06 |
| 5,524,280 A | 6/1996 | Douthitt et al. ............... 455/62 |
| 5,525,898 A | 6/1996 | Lee, Jr. et al. ................ 324/142 |
| 5,526,389 A | 6/1996 | Buell et al. ................. 375/200 |
| 5,528,507 A | 6/1996 | McNamara et al. ......... 364/483 |
| 5,528,597 A | 6/1996 | Gerszberg et al. .......... 370/95.3 |
| 5,539,775 A | 7/1996 | Tuttle et al. ................. 375/200 |
| 5,541,589 A | 7/1996 | Delaney ................. 340/870.02 |
| 5,544,036 A | 8/1996 | Brown, Jr. et al. ........... 364/145 |
| 5,546,424 A | 8/1996 | Miyake ...................... 375/206 |
| 5,548,527 A | 8/1996 | Hemminger et al. ........ 364/492 |
| 5,548,633 A | 8/1996 | Kujawa et al. ................ 379/93 |
| 5,553,094 A | 9/1996 | Johnson et al. .............. 375/200 |
| 5,555,508 A | 9/1996 | Munday et al. ............. 364/492 |
| 5,559,870 A | 9/1996 | Patton et al. ................ 379/107 |
| 5,566,332 A | 10/1996 | Adair et al. ................. 395/600 |
| 5,570,084 A | 10/1996 | Ritter et al. ............ 340/825.05 |
| 5,572,438 A | 11/1996 | Ehlers et al. ................ 364/492 |
| 5,574,657 A | 11/1996 | Tofte et al. ................. 364/510 |
| 5,590,179 A | 12/1996 | Shincovich et al. ......... 379/107 |
| 5,592,470 A | 1/1997 | Rudrapatna et al. ......... 370/320 |
| 5,594,740 A | 1/1997 | LaDue ........................ 379/59 |
| 5,602,744 A | 2/1997 | Meek et al. ............ 364/464.22 |
| 5,617,084 A | 4/1997 | Sears ......................... 331/176 |
| 5,619,192 A | 4/1997 | Ayala ................... 340/870.02 |
| 5,619,685 A | 4/1997 | Schiavone ................. 395/500 |
| 5,621,629 A | 4/1997 | Hemminger et al. .......... 363/56 |
| 5,627,759 A | 5/1997 | Bearden et al. ............. 364/483 |
| 5,631,636 A | 5/1997 | Bane ..................... 340/825.69 |
| 5,636,216 A | 6/1997 | Fox et al. .................... 370/402 |
| 5,640,679 A | 6/1997 | Lundqvist et al. .......... 455/33.2 |
| 5,659,300 A | 8/1997 | Dresselhuys et al. ... 340/870.02 |
| 5,668,803 A | 9/1997 | Tymes et al. ................ 370/312 |
| 5,668,828 A | 9/1997 | Sanderford, Jr. et al. ..... 375/202 |
| 5,673,252 A | 9/1997 | Johnson et al. .............. 370/449 |
| 5,684,472 A | 11/1997 | Bane ..................... 340/870.02 |
| 5,684,799 A | 11/1997 | Bigham et al. .............. 370/397 |
| 5,691,715 A | 11/1997 | Ouellette ................ 340/870.09 |
| 5,692,180 A | 11/1997 | Lee ........................... 395/610 |
| 5,696,501 A | 12/1997 | Ouellette et al. ........ 340/870.02 |
| 5,696,765 A | 12/1997 | Safadi ....................... 370/436 |
| 5,696,903 A | 12/1997 | Mahany ................. 395/200.58 |
| 5,699,276 A | 12/1997 | Roos ..................... 364/514 A |
| 5,714,931 A | 2/1998 | Petite et al. ................. 340/539 |
| 5,715,390 A | 2/1998 | Hoffman et al. ........ 395/188.01 |
| 5,717,604 A | 2/1998 | Wiggins ................. 364/514 C |
| 5,719,564 A | 2/1998 | Sears ................... 340/870.02 |
| 5,732,078 A | 3/1998 | Arango ...................... 370/355 |
| 5,745,901 A | 4/1998 | Entner et al. ................ 707/103 |
| 5,748,104 A | 5/1998 | Argyroudis et al. .... 340/870.11 |
| 5,748,619 A | 5/1998 | Meier ........................ 370/278 |
| 5,751,914 A | 5/1998 | Coley et al. ................. 395/51 |
| 5,751,961 A | 5/1998 | Smyk ................... 395/200.47 |
| 5,754,772 A | 5/1998 | Leaf ...................... 395/200.33 |
| 5,754,830 A | 5/1998 | Butts et al. .................. 395/500 |
| 5,757,783 A | 5/1998 | Eng et al. .................... 370/315 |
| 5,768,148 A | 6/1998 | Murphy et al. .............. 364/492 |
| 5,778,368 A | 7/1998 | Hogan et al. ................ 707/10 |
| 5,787,437 A | 7/1998 | Potterveld et al. ........... 707/103 |
| 5,790,789 A | 8/1998 | Suarez .................. 395/200.32 |
| 5,790,809 A | 8/1998 | Holmes ................. 395/200.58 |
| 5,801,643 A | 9/1998 | Williams et al. ........ 340/870.02 |
| 5,805,712 A | 9/1998 | Davis .......................... 380/50 |
| 5,808,558 A | 9/1998 | Meek et al. ............. 340/870.01 |
| 5,809,059 A | 9/1998 | Souissi et al. ............... 375/202 |
| 5,822,521 A | 10/1998 | Gartner et al. ........... 395/200.6 |
| 5,850,187 A | 12/1998 | Carrender et al. ........ 340/10.42 |
| 5,862,391 A | 1/1999 | Salas et al. ............. 395/750.01 |
| 5,872,774 A | 2/1999 | Wheatley, III et al. ....... 370/335 |
| 5,874,903 A | 2/1999 | Shuey et al. ............ 340/870.02 |
| 5,875,183 A | 2/1999 | Nitadori .................... 370/328 |
| 5,875,402 A | 2/1999 | Yamawaki ................. 455/502 |
| 5,883,886 A * | 3/1999 | Eaton et al. ................ 370/314 |
| 5,884,184 A | 3/1999 | Sheffer ...................... 455/521 |
| 5,892,758 A | 4/1999 | Argyroudis ................ 370/335 |
| 5,896,382 A | 4/1999 | Davis et al. ................. 370/401 |
| 5,897,607 A | 4/1999 | Jenney et al. ................. 702/62 |
| 5,898,387 A | 4/1999 | Davis et al. ............. 340/870.02 |
| 5,907,491 A | 5/1999 | Canada et al. ........... 364/468.15 |
| 5,907,540 A | 5/1999 | Hayashi ..................... 370/315 |
| 5,910,799 A | 6/1999 | Carpenter et al. ........... 345/333 |
| 5,923,269 A | 7/1999 | Shuey et al. ............ 340/870.02 |
| 5,926,103 A | 7/1999 | Petite ................... 340/825.19 |
| 5,926,531 A | 7/1999 | Petite ....................... 379/144 |
| 5,943,375 A | 8/1999 | Veintimilla ................. 375/355 |
| 5,944,842 A | 8/1999 | Propp et al. ................. 714/701 |
| 5,953,319 A | 9/1999 | Dutta et al. ................. 370/238 |
| 5,958,018 A | 9/1999 | Eng et al. |
| 5,959,550 A | 9/1999 | Giles ..................... 340/870.02 |
| 5,960,074 A | 9/1999 | Clark ......................... 379/310 |
| 5,963,146 A | 10/1999 | Johnson et al. ........... 340/870.1 |
| 5,974,236 A | 10/1999 | Sherman ............... 395/200.51 |
| 5,986,574 A | 11/1999 | Colton ................... 340/870.02 |
| 6,000,034 A | 12/1999 | Lightbody et al. ........... 713/202 |
| 6,028,522 A | 2/2000 | Petite ........................ 340/641 |
| 6,034,988 A | 3/2000 | VanderMey et al. ......... 375/202 |
| 6,035,201 A | 3/2000 | Whitehead ................. 455/455 |
| 6,041,056 A | 3/2000 | Bigham et al. .............. 370/395 |
| 6,041,506 A | 3/2000 | Iwao ......................... 370/395 |
| 6,061,604 A | 5/2000 | Russ et al. ..................... 700/90 |
| 6,067,029 A | 5/2000 | Durston .................. 340/870.03 |
| 6,073,169 A | 6/2000 | Shuey et al. ................ 709/217 |
| 6,073,174 A | 6/2000 | Montgomerie et al. ...... 709/224 |
| 6,078,251 A | 6/2000 | Landt et al. ............... 340/10.41 |
| 6,078,785 A | 6/2000 | Bush ............................ 455/7 |
| 6,078,909 A | 6/2000 | Knutson ...................... 705/59 |
| 6,088,659 A | 7/2000 | Kelley et al. ................. 702/62 |
| 6,091,758 A | 7/2000 | Ciccone et al. .............. 375/132 |
| 6,100,817 A | 8/2000 | Mason, Jr. et al. ...... 340/870.02 |
| 6,112,192 A | 8/2000 | Capek ......................... 705/59 |
| 6,124,806 A | 9/2000 | Cunningham et al. .. 340/870.02 |
| 6,128,276 A | 10/2000 | Agee .......................... 370/288 |
| 6,137,423 A | 10/2000 | Glorioso et al. ......... 340/870.02 |
| 6,150,955 A | 11/2000 | Tracy et al. ............. 340/870.02 |
| 6,154,487 A | 11/2000 | Murai et al. ................. 375/150 |
| 6,160,993 A | 12/2000 | Wilson ...................... 455/12.1 |
| 6,172,616 B1 | 1/2001 | Johnson et al. ......... 340/870.12 |
| 6,195,018 B1 | 2/2001 | Ragle et al. ............. 340/870.01 |
| 6,199,068 B1 | 3/2001 | Carpenter .................. 707/100 |
| 6,208,266 B1 | 3/2001 | Lyons et al. ............ 340/870.02 |
| 6,218,953 B1 | 4/2001 | Petite ........................ 340/641 |
| 6,233,327 B1 | 5/2001 | Petite ........................ 379/155 |
| 6,246,677 B1 | 6/2001 | Nap et al. ................... 370/346 |
| 6,249,516 B1 | 6/2001 | Brownrigg et al. .......... 370/338 |
| 6,327,541 B1* | 12/2001 | Pitchford et al. .............. 702/62 |
| 6,333,975 B1* | 12/2001 | Brunn et al. ............ 340/870.02 |
| 6,363,057 B1 | 3/2002 | Ardalan et al. .............. 370/252 |
| 6,393,341 B1 | 5/2002 | Lawrence et al. ........... 700/286 |

| | | | |
|---|---|---|---|
| 6,396,839 B1 | 5/2002 | Ardalan et al. | 370/401 |
| 6,421,731 B1 | 7/2002 | Ciotti, Jr. et al. | 709/238 |
| 6,430,268 B1 | 8/2002 | Petite | 379/39 |
| 6,437,692 B1 | 8/2002 | Petite et al. | 340/540 |
| 6,446,192 B1 | 9/2002 | Narasimhan et al. | 712/29 |
| 6,643,278 B1 | 11/2003 | Panasik et al. | 370/330 |
| 6,657,549 B1 | 12/2003 | Avery | 340/825.49 |
| 6,684,245 B1 | 1/2004 | Shuey et al. | 709/223 |
| 6,751,563 B2 | 6/2004 | Spanier et al. | 702/61 |
| 6,836,737 B2* | 12/2004 | Petite et al. | 340/870.02 |
| 6,867,707 B1 | 3/2005 | Kelley et al. | 340/870.02 |
| 6,873,602 B1* | 3/2005 | Ambe | 370/254 |
| 7,061,924 B1* | 6/2006 | Durrant et al. | 370/401 |
| 2001/0002210 A1 | 5/2001 | Petite | 379/155 |
| 2001/0024163 A1 | 9/2001 | Petite | 340/628 |
| 2002/0012323 A1 | 1/2002 | Petite et al. | 370/252 |
| 2002/0013679 A1 | 1/2002 | Petite | 702/188 |
| 2002/0019712 A1 | 2/2002 | Petite et al. | 702/61 |
| 2002/0019725 A1 | 2/2002 | Petite | 702/188 |
| 2002/0026957 A1 | 3/2002 | Reyman | 137/39 |
| 2002/0027504 A1 | 3/2002 | Davis et al. | 340/540 |
| 2002/0031101 A1 | 3/2002 | Petite et al. | 370/310 |
| 2002/0085719 A1* | 7/2002 | Crosbie | 380/248 |
| 2002/0094799 A1 | 7/2002 | Elliott et al. | 455/405 |
| 2002/0125998 A1 | 9/2002 | Petite et al. | 340/286.01 |
| 2002/0145537 A1 | 10/2002 | Mueller et al. | 340/870.02 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0123442 A1 | 7/2003 | Drucker et al. | 370/392 |
| 2003/0193952 A1* | 10/2003 | O'Neill | 370/392 |
| 2003/0202512 A1 | 10/2003 | Kennedy | 370/389 |
| 2004/0113810 A1 | 6/2004 | Mason, Jr. et al. | 340/870.02 |
| 2005/0184881 A1 | 8/2005 | Dusenberry et al. | 340/870.02 |
| 2005/0270173 A1 | 12/2005 | Boaz | 340/870.02 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |
| WO | WO 2004/004364 A2 | 1/2004 |

OTHER PUBLICATIONS

Brownrigg, E. Ph.D., "Developing the Information Superhighway Issues for Libraries", *Library Perspectives on NREN*, The National Research and Education Network, 1990, 55-63.

Brownrigg, E.B., "The Internet as an External Economy: The Emergence of the Invisible Hand", *Library Administration and Management*, 1991, 95-97.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6.

Johnson, D.B., "Routing in Ad Hoc Networks of Mobile Hosts", *IEEE*, 1995, 158-163.

Jubin, J., "Current Packet Radio Networks Protocols", *IEEE Infocom Proceedings*, 1985, 86-92.

Jubin, J. et al., "The DARPA Packet Radio Network Protocols", *Proceedings of the IEEE*, 1987, 75(1), 21-32.

Kahn, R.E., "The Organization of Computer Resources into a Packet Radio Network", *IEEE Transactions on Communications*, 1977, 25(1), 169-178.

Kahn, R.E., et al., "Advances in Packet Radio Technology", *proceedings of the IEEE*, 1978, 66(11), 1468-1496.

Lauer, G. et al., "Survivable Protocols for Large Scale Packet Radio Networks", *IEEE Global Telecommunications Conference*, 1984, 468-471.

Lynch, C.A. et al., "Electronic Publishing, Electronic Imaging, and Document Delivery", *Electronic Imaging, International Electronic Imaging Exposition & Conference*, 1986, 662-667.

Lynch, C.A. et al., "The Telecommunications Landscape", 1986, 7 pages.

Lynch, C.A. et al., "Routing, Repeating, Power Control and Directional Techniques", *Packet Radio Networks*, Architectures, Protocols, Technologies and Applications, 1987, Ch 5, 105-129, 259-274.

MacGregor, W. et al., "Multiple Control Stations in Packet Radio Networks", *IEEE Military Communications Conference*, 1982, 10.3-1-10.3-5.

Shachan, N. et al., "A Packet Radio Network for Library Automation", *IEEE Military Communications Conference*, 1987, 2, 21.3.1-21.3.7.

Shacham, N. et al., "Future Directions in Packet Radio Technology", *IEEE Infocom Proceedings*, 1985, 93-98.

Westcott, J.A., "Issues in Distributed Routing for Mobile Packet Radio Networks", *IEEE*, 1982, 233-238.

Wescott, J. et al., "A Distributed Routing Design for a Broadcast Environment", *IEEE Military Communications Conference*, 1982, 10.4-1-10.4-5.

"Packet Radio: Applications for Libraries in Developing Countries", *UDT Series on Data Communication Technologies and Standards for Libraries*, 1993, Ch 1-6, 87 pages.

Chlamtac, I. et al., "Optimizing the System of Virtual Paths", *IEEE ACM Transactions on Networking*, 1994, 2(6), 581-586.

Leung, V.C.M., "Internetworking Wireless Terminals to Local Area Networks Via Radio Bridges", *ICWC*, 1992, 126-129.

Pollini, G.P. et al., "Path Optimization Procedures for Efficient Routing of Information after an Inter-Switch Handover", *IEEE*, 1994, 1-5.

Rajagopalan, B. et al., "A New Responsive Distributed Shortest-Path Routing Algorithm", *ACM*, 1989, 237-246.

Desbonnet, Joe et al., "System Architecture and Implementation of CEBus/Internet Gateway", *IEEE*, 1997, 1057-1062.

Markwalter, Brian et al., "CEBus Network Layer Description", *IEEE*, 1989, 571-575.

Newtown, Harry, *Newton's Telecom Dictionary*, Flatiron Publishing, Inc., 10$^{th}$ Ed., 1996, LAN (1 of 1): Cebus Overview (1-3): Cebus Industry Council (1 of 1).

Newtown, Harry, *Newton's Telecom Dictionary*, 10th Edition, 1996, 243.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998:—MOBITEX®: The Heart of Every BellSouth Solution—MOBITEX Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995—Comparative Analysis of Coverage and Performance: RAM & Ardis, 1998.

Internet Printout, http://www.ardis.com "Ardis Two-Way, Wireless Data Communications," ARDIS, Sep. 23, 1998.

Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.

"MV-90 Read Only System" UTS Software Solutions For Utility Customers. (No Date). (No Page Numbers or Pages).

Rappaport, T. S., "Wireless Communications, Principles and Practice," Prentice Hall PTR, 1996, pp. 410-413.

Brochure: TRF6900 Single-Chip RF Transceiver, Texas Instrument, 2001©.

Corcoran, P.M. et al., "CEBus Network Access via the World-Wide-Web", *International Conference on Consumer Electronics*, Jun. 5-7, 1996, 236-237, XP-002218722.

Corcoran, P.M. et al., "Browser-Style Interfaces to a Home Automation Network", *IEEE Trans. On Consumer Electronics*, Nov. 1, 1997, 43(4), 1063-1069, XP-000768559.

\* cited by examiner

SYSTEM FOR AUTOMATED MANAGEMENT OF SPONTANEOUS NODE MIGRATION IN A DISTRIBUTED FIXED WIRELESS NETWORK

FIELD OF THE INVENTION

The present invention relates to wireless networks for collecting data, and more particularly, to systems and methods for managing the migration of nodes on such networks.

BACKGROUND OF THE INVENTION

The collection of meter data from electrical energy, water, and gas meters has traditionally been performed by human meter-readers. The meter-reader travels to the meter location, which is frequently on the customer's premises, visually inspects the meter, and records the reading. The meter-reader may be prevented from gaining access to the meter as a result of inclement weather or, where the meter is located within the customer's premises, due to an absentee customer. This methodology of meter data collection is labor intensive, prone to human error, and often results in stale and inflexible metering data.

Some meters have been enhanced to include a one-way radio transmitter for transmitting metering data to a receiving device. A person collecting meter data that is equipped with an appropriate radio receiver need only come into proximity with a meter to read the meter data and need not visually inspect the meter. Thus, a meter-reader may walk or drive by a meter location to take a meter reading. While this represents an improvement over visiting and visually inspecting each meter, it still requires human involvement in the process.

An automated means for collecting meter data involves a fixed wireless network. Devices such as, for example, repeaters and gateways are permanently affixed on rooftops and pole-tops and strategically positioned to receive data from enhanced meters fitted with radio-transmitters. Typically, these transmitters operate in the 902-928 MHz range and employ Frequency Hopping Spread Spectrum (FHSS) technology to spread the transmitted energy over a large portion of the available bandwidth.

Data is transmitted from the meters to the repeaters and gateways and ultimately communicated to a central location. While fixed wireless networks greatly reduce human involvement in the process of meter reading, such systems require the installation and maintenance of a fixed network of repeaters, gateways, and servers. Identifying an acceptable location for a repeater or server and physically placing the device in the desired location on top of a building or utility pole is a tedious and labor-intensive operation. Furthermore, each meter that is installed in the network needs to be manually configured to communicate with a particular portion of the established network. When a portion of the network fails to operate as intended, human intervention is typically required to test the effected components and reconfigure the network to return it to operation.

Thus, while existing fixed wireless systems have reduced the need for human involvement in the daily collection of meter data, such systems require substantial human investment in planning, installation, and maintenance and are relatively inflexible and difficult to manage. Therefore, there is a need for networks that do not depend on pre-determined communication paths, but instead rapidly adapt to changing wireless communications conditions so as to maintain optimal network connectivity. These networks, where nodes in the network can change communication paths spontaneously based on changing wireless communication performance, have a need for a system to manage the wireless network as nodes migrate among the many communication paths.

SUMMARY OF THE INVENTION

The present invention is directed to methods and systems of managing the migration of wireless nodes amongst repeaters and collectors in a wireless network. According to a first aspect of the invention, there is provided a system for managing nodes migrating from a first communication path to a second communication path in a wireless network. The system includes a first collector disposed within the first communication path and a second collector disposed within the second communication path, a network management server that determines a network state, and a network management system that maintains a database of the network state. When the network management server detects that a node has migrated from the first communication path to the second communication path, information associated with the node is retrieved from a global database of device configuration parameters and downloaded to the second collector. In this way, the system ensures that each collector has the configuration information for each meter communicating through it.

According to a feature, a current network state database and a historical network state database may be update to reflect that the node has migrated from the first communication path to the second communication path.

According to another aspect of the invention, there is provided a method of managing nodes that spontaneously migrate among plural communication paths in a wireless network. The method includes detecting a migration of a node from a first communication path to a second communication path; updating a network state; retrieving information associated with the node from a first intermediary node in the first communication path; and downloading the information to a second intermediary node in the second communication path.

According to a feature, a current network state database and a historical network state database may be updated to reflect that the node has migrated from the first communication path to the second communication path. Also, the node may be configured in the second communication path in accordance with the information. The collected data from the first intermediary node may be merged with second collected data that is collected after the node migrated to the second communication path. The information may be removed from the first intermediary node after being downloaded to the second intermediary node.

According to another aspect of the invention there is provided a method for managing a spontaneous migration of a meter from a first collector in a first communication path to a second collector in a second communication path. The method includes detecting the spontaneous migration; retrieving configuration information and first collected data associated with the meter; contacting the second collector and download the configuration information and the first collected data; and merging the first collected data with second collected data associated with the meter stored in the second collector.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-3. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector is operable to automatically identify and register meters for communication with the collector. When a meter is installed, the meter becomes registered with the collector that can provide a communication path to the meter. The collectors receive and compile metering data from a plurality of meter devices via wireless communications. A communications server communicates with the collectors to retrieve the compiled meter data.

Figure 1:
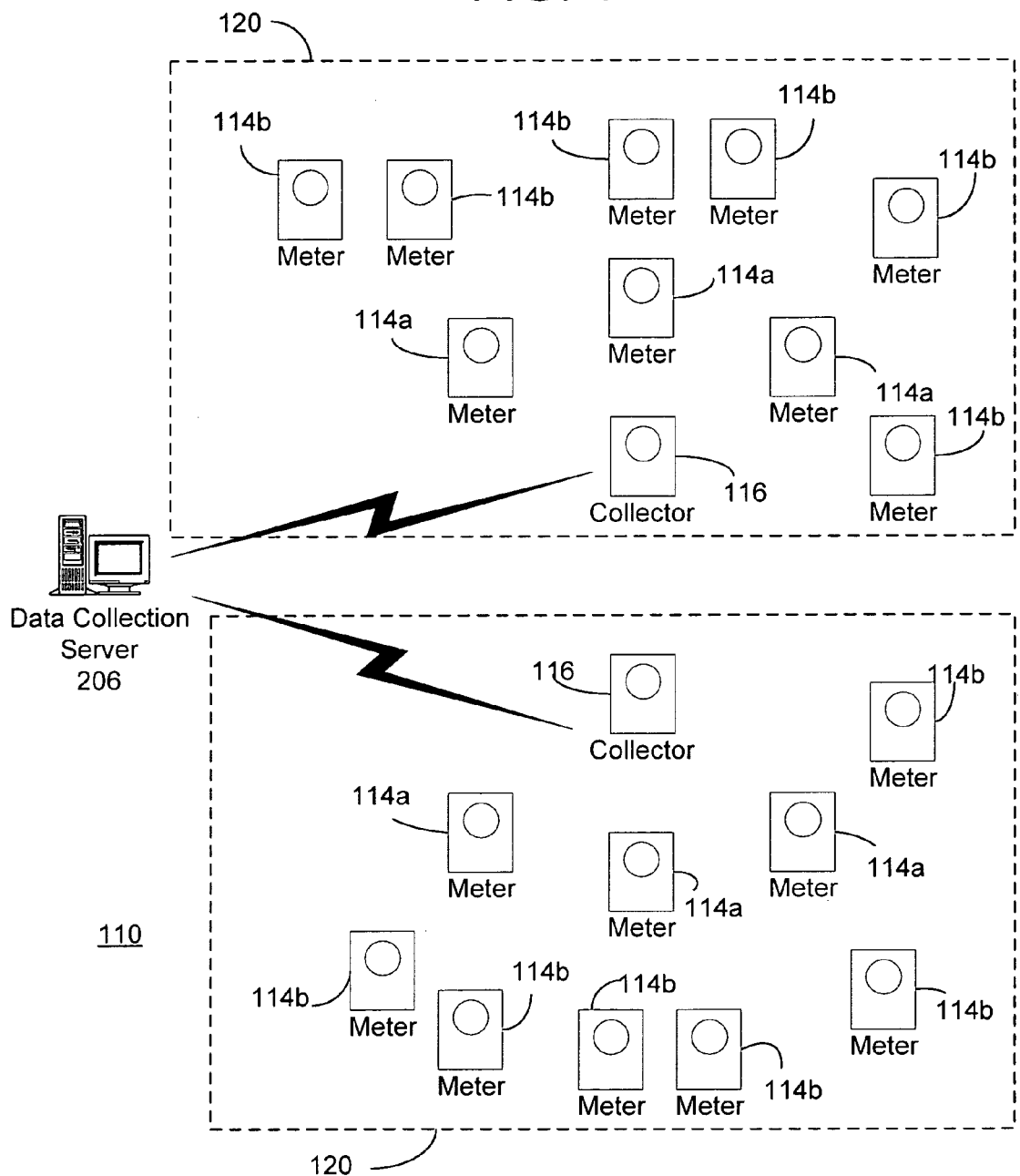
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, a electrical meters manufactured by Elster Electricity, LLC.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, meters 114 may be, for example, an electrical meter manufactured by Elster Electricity, LLC.

A collector 116 and the meters 114 for which it is configured to receive meter data define a subnet/LAN 120 of system 110. As used herein, meters 114 and collectors 116 maybe considered as nodes in the subnet 120. For each subnet/LAN 120, data is collected at collector 116 and periodically transmitted to a data collection server 206. The data collection server 206 stores the data for analysis and preparation of bills. The data collection server 206 may be a specially programmed general purpose computing system and may communicate with collectors 116 wirelessly or via a wire line connection such as, for example, a dial-up telephone connection or fixed wire network.

Generally, collector 116 and meters 114 communicate with and amongst one another using any one of several robust wireless techniques such as, for example, frequency hopping spread spectrum (FHSS) and direct sequence spread spectrum (DSSS). As illustrated, meters 114a are "first level" meters that communicate with collector 116, whereas meters 114b are higher level meters that communicate with other meters in the network that forward information to the collector 116.

Figure 2:
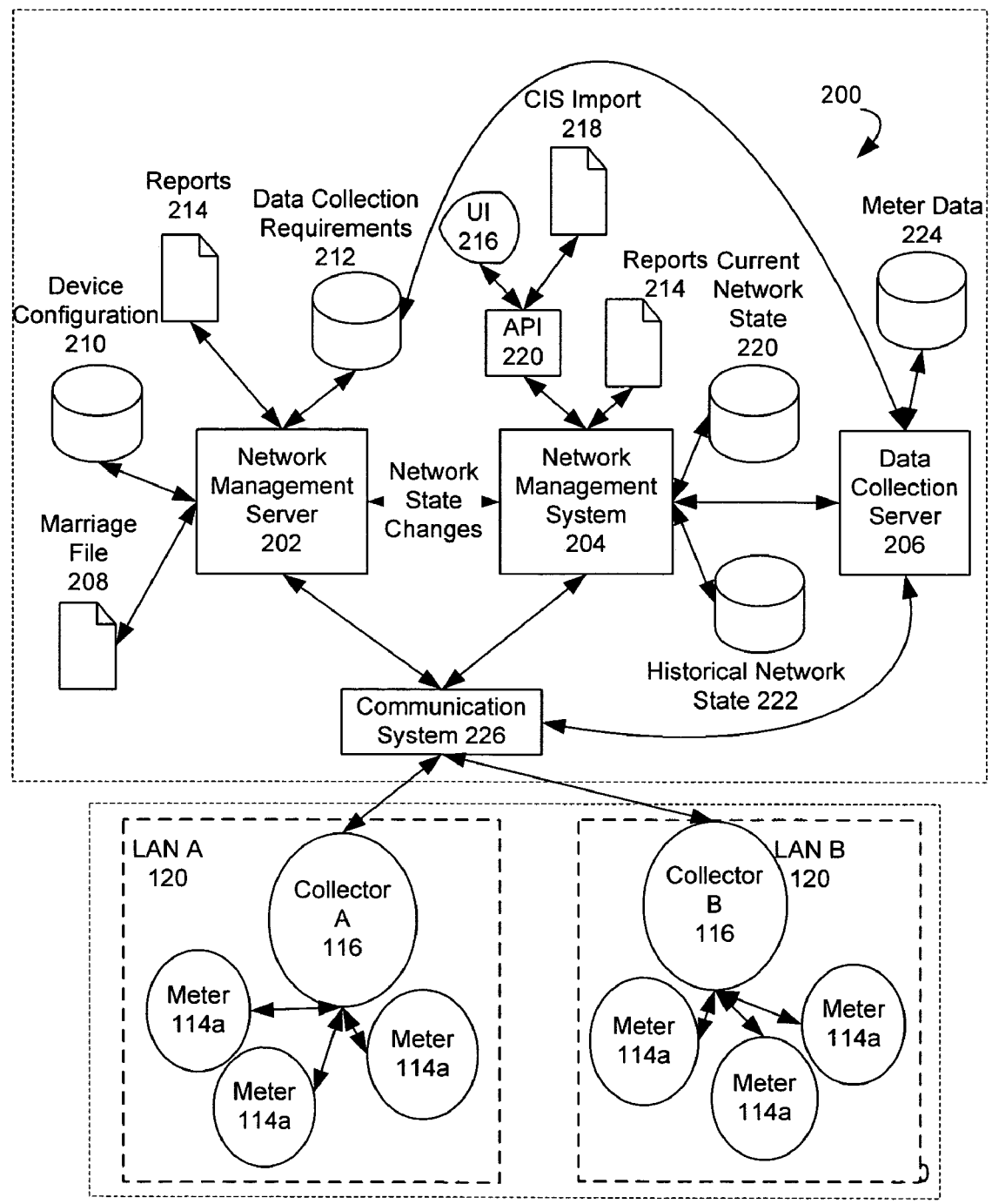
FIG. 2 expands upon the diagram of FIG. 1 and illustrates a system in which the present invention is embodied.
Figure 3:
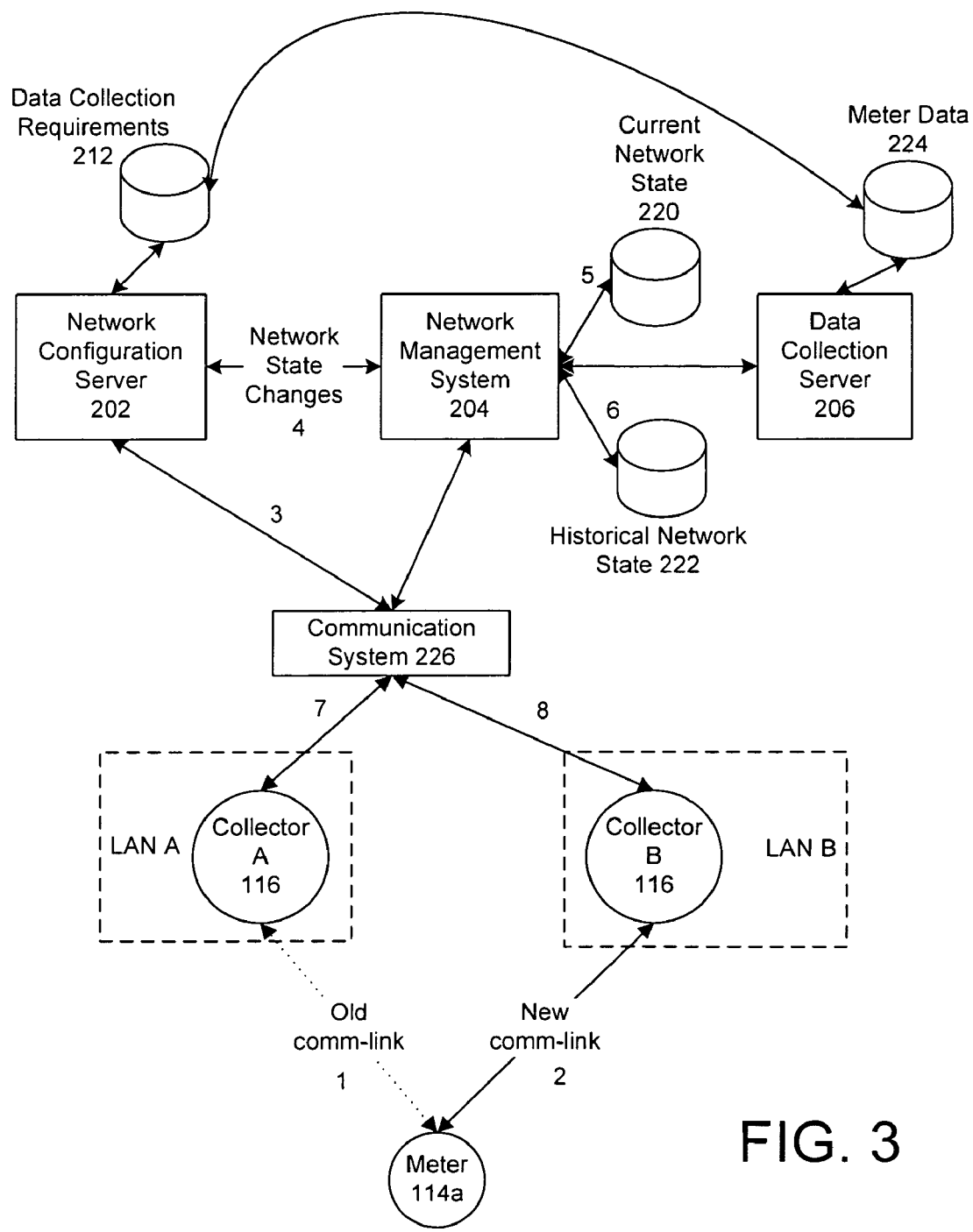
FIG. 3 illustrates an exemplary sequence of events when a meter switches from a first collector to a second collector.

Referring now to FIG. 2, there is illustrated a system 200 in which the present invention may be embodied. The system 200 includes a network management server 202, a network management system (NMS) 204 and a data collection server 206 that together manage one or more subnets/LANs 120 and their constituent nodes. The NMS 204 tracks changes in network state, such as new nodes registering/unregistering with the system 200, node communication paths changing, etc. This information is collected for each subnet/LAN 120 and are detected and forwarded to the network management server 202 and data collection server 206.

In accordance with an aspect of the invention, communication between nodes and the system 200 is accomplished using the LAN ID, however it is preferable for customers to query and communicate with nodes using their own identifier. To this end, a marriage file 208 may be used to correlate a customer serial number, a manufacturer serial number and LAN ID for each node (e.g., meters 114a and collectors 116) in the subnet/LAN 120. A device configuration database 210 stores configuration information regarding the nodes. For example, in the metering system 110, the device configuration database may include data regarding time of use (TOU) switchpoints, etc. for the meters 114a and collectors 116 communicating to the system 200. A data collection requirements database 212 contains information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

The network management system (NMS) 204 maintains a database describing the current state of the global fixed network system (current network state 220) and a database describing the historical state of the system (historical network state 222). The current network state 220 contains data regarding current meter to collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may be implemented in accordance with the present invention. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network management server 202, network management system 204 and data collection server 206 communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, etc., or any combination of the above and enables the system 200 to communicate with the metering system 110.

The present invention provides a system and method for downloading a meter's collection data from an old collector to a new collector upon determining that the meter changed collectors. The present invention serves to ensure that the new collector is able to provide accurate metering data to the system 200 when requested, as well as properly configure the meter. With reference to FIG. 3, it is shown that the meter 114a has changed its communication path from collector A to collector B (steps 1-2). In the exemplary communication paths, the collectors are intermediary nodes between the meter 114a and the communication system 226. Next, the network management server 202 detects the change in the communication path of meter 114a from LAN A to LAN B (step 3). The network management server 202 then sends network state updates to the network configuration system 204 and the data collection system 206 (step 4). A data collection requirements database 212, may also be updated, if necessary. The network management system 204 then updates the current network configuration 220 (step 5) and the historical network configuration 222 (step 6) to reflect the change.

Prior to the meter 114a changing LANs, it is possible that collector A in LAN A has collected meter data and contains configuration information associated with the meter 114a. This data and configuration information may include historical demand, load profile and event data. If collector A has such data, it is advantageous to make collector B aware of that data in order to accurately collect subsequent data from the meter 114a. Therefore, according to the present invention, to ensure that collector B has all of the data and configuration information associated with meter 114a, the system 200 contacts collector A after detecting the change (step 7) and downloads the meter's settings and data from collector A. Next, the system 200 communicates the information to collector B (step 8) where the settings and data from collector A are merged with data and configuration information contained in collector B for the meter 114a. The data contained in collector A is removed to free up space on the collector. In this manner, meter data and configuration information is maintained at the appropriate collector. As such, collector B will have all of the historical information for meter 114a and will be able to accurately provide metering data to the system 200 when requested.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. A system for managing meters migrating from a first communication path to a second communication path in a wireless network, the system comprising:
   a first collector and a plurality of meters that communicate wirelessly with said first collector disposed within said first communication path,
   a second collector and a plurality of meters that communicate wirelessly with said second collector disposed within said second communication path,
   wherein each meter has a communication path to a respective collector that is either direct or indirect through one or more intermediate meters that serve as repeaters, the wireless communication paths between each meter and a respective collector defining a layout of the network;
   a network management server that determines a network state; and
   a network management system that maintains a database of said network state,
   wherein when said network management server detects that a meter has migrated from said first communication path to said second communication path, information associated with said meter is retrieved from said network management server and downloaded to said second collector;
   wherein said information associated with said meter comprises first collected data collected by said first collector from said meter;
   wherein second collector data collected by the second collector from said meter is merged at the second collector with the first collected data, and
   wherein said first collected data and said second collected data comprise metering information representative of usage of a service or commodity.

2. The system of claim 1, further comprising updating a current network state database and a historical network state database to reflect that said meter has migrated from said first communication path to said second communication path.

3. The system of claim 1, wherein said information associated with said meter comprises configuration information.

4. The system of claim 3, wherein said configuration information is downloaded to said second collector to determine operational characteristics of said meter within said second communication path.

5. The system of claim 1, wherein said information is removed from said first collector after being downloaded to said second collector.

6. A method of managing meters that spontaneously migrate among plural communication paths in a wireless network, the method comprising:
   detecting a migration of a meter from a first communication path to a second communication path, wherein each said communication path comprises a collector and a plurality of meters that communicate wirelessly with their respective collector, each of the said meters having a wireless communication path to a respective collector that is either a direct path or an indirect path through one or more intermediate meters that serve as repeaters, the wireless communication paths between each meter and a respective collector defining a layout of the network;
   updating a network state;
   retrieving information associated with said meter from a global configuration database; and
   downloading said information to a second collector in said second communication path;
   wherein said information associated with said meter comprises first collected data collected by a first collector from said meter;
   merging, at the second collector, second collector data collected by the second collector from said meter with the first collected data, and
   wherein said first collected data and said second collected data comprise metering information representative of usage of a service or commodity.

7. The method of claim 6, further comprising:
   updating a current network state database and a historical network state database to reflect that said meter has migrated from said first communication path to said second communication path.

8. The method of claim 6, further comprising:
   configuring said meter in said second communication path in accordance with said information.

9. The method of claim 6, further comprising:
removing said information from a first collector in said first communication path after being downloaded to said collector.

10. A method for managing a spontaneous migration of a meter from a first collector in a first communication path to a second collector in a second communication path comprising:
detecting said spontaneous migration;
retrieving configuration information and first collected data collected by the first collector from said meter;
contacting said second collector and downloading said configuration information and said first collected data; and
merging at said second collector said first collected data with second collected data collected by the second collector from said meter;
wherein said first collected data and said second collected data comprise metering information representative of usage of a service or commodity; and
wherein each said communication path comprises a collector and a plurality of meters that communicate wirelessly with their respective collector, each of the meters having a wireless communication path to a respective collector that is either a direct path or an indirect path through one or more intermediate meters that serve as repeaters, the wireless communication paths between each meter and a respective collector defining a layout of the network.

11. The method of claim 10, further comprising:
updating a current network state database and a historical network state database to reflect that said meter has migrated from said first communication path to said second communication path.

12. The method of claim 11, further comprising:
removing said information and said first collected data from said first collector.

13. The method of claim 11, further comprising:
updating a data collection requirements server to reflect that said meter has migrated from said first communication path to said second communication path.

14. The method of claim 13, wherein data accessible to said data collection requirements server indicates what types of data said meter collects.

15. The method of claim 10, wherein said configuration information determines operating characteristics of said meter.

* * * * *